United States Patent
Amino

(10) Patent No.: US 7,820,751 B2
(45) Date of Patent: Oct. 26, 2010

(54) RUBBER COMPOSITION FOR PNEUMATIC TIRE

(75) Inventor: Naoya Amino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/929,422

(22) Filed: Oct. 30, 2007

(65) Prior Publication Data

US 2008/0058462 A1 Mar. 6, 2008

Related U.S. Application Data

(62) Division of application No. 10/510,217, filed as application No. PCT/JP2004/001405 on Feb. 10, 2004, now abandoned.

(51) Int. Cl.
*C08K 3/04* (2006.01)

(52) U.S. Cl. .................. 524/496; 524/495; 152/450

(58) Field of Classification Search .......... 524/495, 524/496; 152/450
See application file for complete search history.

(56) References Cited

U.S. PATENT DOCUMENTS

| | | | |
|---|---|---|---|
| 3,964,951 A | 6/1976 | Kremer et al. | |
| 4,128,438 A | 12/1978 | Wolff et al. | |
| 6,417,283 B1* | 7/2002 | Ikeda et al. | 525/326.1 |
| 6,627,693 B1 | 9/2003 | Laube et al. | |

| | | | |
|---|---|---|---|
| 2003/0105213 A1* | 6/2003 | Hayashi et al. | 524/492 |
| 2004/0119190 A1* | 6/2004 | Kawazoe et al. | 264/140 |

FOREIGN PATENT DOCUMENTS

| | | |
|---|---|---|
| GB | 2 056 995 A | 3/1981 |
| JP | 62-101641 A1 | 5/1987 |
| JP | 63-286446 A1 | 11/1988 |
| JP | 63-289041 A1 | 11/1988 |
| JP | 63289041 A | 11/1988 |
| JP | 64-20246 A1 | 1/1989 |
| JP | 64020246 A | 1/1989 |
| JP | 01207359 A | 8/1989 |
| JP | 02055747 A | 2/1990 |
| JP | 07-330958 | 12/1995 |
| JP | 09-176513 | 7/1997 |
| JP | 10-130424 A1 | 5/1998 |
| JP | 10-330544 | 12/1998 |
| JP | 2000-154327 A1 | 6/2000 |
| JP | 2001-207080 | 7/2001 |

OTHER PUBLICATIONS

Akimasa Doi, "Recent Technology Trends for Tire", Nippon Gomu Kyokaishi, vol. 71, p. 588-594 (1998).

* cited by examiner

*Primary Examiner*—Peter D Mulcahy
(74) *Attorney, Agent, or Firm*—Connolly Bove Lodge & Hutz LLP

(57) ABSTRACT

A rubber composition for a pneumatic tire containing 100 parts by weight of a diene-based rubber and 5 to 120 parts by weight of carbon black having a particle size of 15 to 40 nm, a nitrogen absorption specific surface area $N_2SA$ of 60 to 200 $m^2/g$, and a pH of 1 to 5 or 8.5 to 13, which can improve wet performance of a tire without causing problems in productivity and conductivity.

4 Claims, No Drawings

RUBBER COMPOSITION FOR PNEUMATIC TIRE

RELATED APPLICATIONS

This application is a divisional of U.S. application Ser. No. 10/510,217, filed Oct. 5, 2007 which in turn is a national stage of PCT/JP04/01405, filed Feb. 10, 2004, disclosures of which are incorporated herein by reference.

TECHNICAL FIELD

The present invention relates to a rubber composition for a pneumatic tire, more specifically it relates to a rubber composition for a pneumatic tire capable of improving the wet performance of the pneumatic tire, without causing problems in productivity and conductivity.

BACKGROUND ART

As a rubber composition for a tire, the technology of compounding silica into a rubber composition is known to obtain both wet performance and low fuel consumption of a pneumatic tire (see, for example, Akimasa Doi, *Nippon Gomu Kyokaishi*, vol. 71, p. 588 (1998)). As the reason why the silica exhibits such characteristics, it is mentioned that a silica-compounding rubber has a low modulus in the low strain region. However, there are problems that, when silica is compounded, the vulcanization rate becomes slower and the electrical resistance becomes larger, and therefore a large amount of silica cannot be compounded.

DISCLOSURE OF INVENTION

Accordingly, an object of the present invention is to provide a rubber composition for a pneumatic tire capable of solving the problems of the prior art in the above silica-compounding rubber compositions and of improving the wet performance of the tire without causing a deterioration in the productivity and conductivity thereof.

In accordance with the present invention, there is provided a rubber composition for a pneumatic tire comprising (i) 100 parts by weight of a diene-based rubber and (ii) 5 to 120 parts by weight of carbon black having a particle size of 15 to 40 nm, a nitrogen absorption specific surface area $N_2SA$ of 60 to 200 $m^2/g$ and a pH of 1 to 5 or 8.5 to 13.

BEST MODE FOR CARRYING OUT THE INVENTION

The diene-based rubbers compounded into the rubber composition according to the present invention include, for example, any diene-based rubbers capable of using as a starting rubber for a tire. As the typical diene-based rubbers, natural rubbers (NR), polyisoprene rubbers (IR), various types of polybutadiene rubbers (BR), various types of styrene-butadiene copolymer rubbers (SBR), ethylene-propylene-diene terpolymer rubbers (EPDM), etc. may be mentioned. These may be used alone or in any blends thereof.

The rubber composition for a tire of the present invention contains 5 to 120 parts by weight of carbon black having a particle size of 15 to 40 nm, preferably 18 to 35 nm, a nitrogen specific area ($N_2SA$) of 60 to 200 $m^2/g$, preferably 70 to 180 $m^2/g$ and a pH of 1 to 5 or 8.5 to 13, preferably 2 to 4.5 or 9 to 12.

The particle size of the carbon black used in the present invention means an average particle size measured according to an ASTM D 3849 method. If this value is too small, the dispersibility of the carbon black in the rubber unpreferably deteriorates. Conversely, if the value is too great, the reinforcibility of the carbon black unpreferably becomes insufficient.

The nitrogen absorption specific surface area $N_2SA$ ($m^2/g$) is the value of the specific surface area of the carbon black representing the carbon black particle size and is measured according to a JIS-K 6217 method. If the $N_2SA$ value of the carbon black used in the present invention is too low, the reinforcibility of the carbon black will unpreferably become insufficient. Conversely, if the $N_2SA$ value is too high, the dispersibility of the carbon black in the rubber will unpreferably deteriorate.

The carbon black used in the present invention should, as explained above, have a pH of 1 to 5 or 8.5 to 13. When the value is within these ranges, since the surface activity thereof differs from that of, for example, the furnace black, which is ordinarily used for rubber, of a pH of about 6 to 8, tight bound rubber is not formed and there are little strongly constrained rubber molecules and, therefore, the modulus in the low strain region becomes lower as in the case of silica and, as a result, the wet performance of the tire can be improved.

The carbon black used in the present invention preferably has a dibutyl phthalate absorption DBPA of 30 to 80 ml/100 g, more preferably 35 to 75 ml/100 g. When the carbon black having this range of DBPA is used, the frictional force is further preferably increased. Note that it is also possible to use silica, in combination with the carbon black, in a range not causing any problem in the productivity so as to further improve the wet performance.

The rubber composition according to the present invention may also include, in addition to the above essential ingredients various types of additives generally compounded for tire use, such as a vulcanization or cross-linking agent, vulcanization or cross-linking accelerator, various types of oils, an anti-aging agent, a plasticizer. The formulation may be used for vulcanization or cross-linking as a composition by mixing them in a general method. The amounts of these additives compounded may be conventional amounts generally used so long as they do not violate the object of the present invention.

EXAMPLES

Examples will now be used to further explain the present invention, but needless to say the scope of the present invention is not limited to these Examples.

Examples 1 to 4 and Comparative Examples 1 to 6

Preparation of Samples

According to the formulation (parts by weight) shown in Table I, a 1.7 liter internal Bambury mixer was used to mix the rubber, carbon black, and other ingredients except for the sulfur and vulcanization accelerator for 5 minutes so as to obtain a master batch, then an open roll was used to mix the vulcanization accelerator and sulfur to obtain the rubber composition. The rubber composition thus obtained was vulcanized using a 15×15×0.2 cm mold at a temperature of 160° C. for 30 minutes to obtain a vulcanized rubber sheet.

Next, a rheometer test was conducted and the viscoelasticity (tan δ) of the vulcanized rubber sheet obtained was measured. The results are shown in Table I.

TABLE I

|  | Comp. Ex. 1 | Comp. Ex. 2 | Comp. Ex. 3 | Comp. Ex. 4 | Ex. 1 | Comp. Ex. 5 | Ex. 2 | Ex. 3 | Comp. Ex. 6 | Ex. 4 |
|---|---|---|---|---|---|---|---|---|---|---|
| Formulation (parts by weight) | | | | | | | | | | |
| NIPOL 9528R | 137.5 | 137.5 | 137.5 | 137.5 | 137.5 | 137.5 | 137.5 | 137.5 | 137.5 | 137.5 |
| Nipsil AQ | 40 | — | — | — | — | — | — | — | — | 20 |
| Si-69 | 3.2 | — | — | — | — | — | — | — | — | 1.6 |
| Diablack N234 | 40 | 80 | — | — | — | — | — | — | — | — |
| #44 | — | — | 80 | — | — | — | — | — | — | — |
| #33 | — | — | — | 80 | — | — | — | — | — | — |
| MA11 | — | — | — | — | 80 | — | — | — | — | 6.0 |
| #7400SB | — | — | — | — | — | 80 | — | — | — | — |
| Ravem 1035 | — | — | — | — | — | — | 80 | — | — | — |
| Black Pearls L | — | — | — | — | — | — | — | 80 | — | — |
| #950 | — | — | — | — | — | — | — | — | 80 | — |
| Santoflex 6PPD | 1 | 1 | 1 | 1 | 1 | 1 | 1 | 1 | 1 | 1 |
| Zinc Oxide No. 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Santocure NS | 1.5 | 1.5 | 1.5 | 1.5 | 1.5 | 1.5 | 1.5 | 1.5 | 1.5 | 1.5 |
| Sulfur | 2.0 | 2.0 | 2.0 | 2.0 | 2.0 | 2.0 | 2.0 | 2.0 | 2.0 | 2.0 |
| pH of carbon | 7 | 7 | 8 | 8 | 3.5 | 7.0 | 3.0 | 3.0 | 7.0 | 3.5 |
| $N_2$SA of carbon | 123 | 123 | 125 | 93 | 104 | 85 | 98 | 138 | 250 | 104 |
| DBPA of carbon | 124 | 124 | 76 | 76 | 65 | 73 | 65 | 60 | 80 | 65 |
| Particle size of carbon (nm) | 22 | 22 | 24 | 28 | 29 | 28 | 26 | 24 | 16 | 29 |
| Evaluation | | | | | | | | | | |
| tan δ/E' (0° C.) | 100 | 93 | 97 | 98 | 106 | 96 | 103 | 104 | 74 | 111 |
| T95 (min) | 20.6 | 7.1 | 6.4 | 6.7 | 7.2 | 7.1 | 7.8 | 10.4 | 7.3 | 9.8 |

Footnotes of Table I

Nipol 9528R: Styrene-butadiene copolymer rubber made by Zeon Corporation (37.5 phr oil extended, Tg=−35° C.).
Nipsil AQ: Wet silica made by Nippon Silica Industrial.
Si-69: Silane coupling agent made by Degussa.
Diablack N234: Carbon black made by Mitsubishi Chemical.
44: Carbon black made by Mitsubishi Chemical.
33: Carbon black made by Mitsubishi Chemical.
MA11: Carbon black made by Mitsubishi Chemical.
7400SB: Carbon black made by Tokai Carbon.
Ravem 1035: Carbon black made by Columbian Carbon.
Black Pearls L:. Carbon black made by Cabot.
950: Carbon black made by Mitsubishi Chemical.
Santoflex 6PPD: antioxidant made by Flexsys.
Zinc Oxide No. 3: made by Seido Chemical.
Stearic acid: made by Nippon Oil and Fat Co.
Aromatic oil: made by Fuji Kosan.
Santocure NS: Vulcanization accelerator made by Flexsys.
Sulfur: made by Tsurumi Chemical.

Evaluation and Test Methods

1) Viscoelasticity Test (tan δ/E')

The values were measured using a viscoelastic spectrometer (manufactured by Toyo Seiki Seisakusho, Japan) under the conditions of a temperature of 0° C. and an initial static strain of 10%, a dynamic strain of ±2% and a frequency of 20 Hz. The results were shown as indexes making the value of Comparative Example 1 as 100. The larger the values, the more excellent the tire wet performance.

2) Rheometer Test (T95)

According to JIS K6300, the time for reaching 95% vulcanization at 160° C. was measured. The shorter this time, the better the productivity shown.

Examples 5 to 8 and Comparative Examples 1 to 6

According to the formulation (parts by weight) shown in Table II, the same procedure was followed as in Examples 1 to 4 to prepare samples and the above test methods were followed to evaluate them. The results are shown in Table II. Note that Comparative Examples 1 to 6 shown in Table II are the same as those of Table I.

TABLE II

|  | Comp. Ex. 1 | Comp. Ex. 2 | Comp. Ex. 3 | Comp. Ex. 4 | Ex. 5 | Comp. Ex. 5 | Ex. 6 | Ex. 7 | Comp. Ex. 6 | Ex. 8 |
|---|---|---|---|---|---|---|---|---|---|---|
| Formulation (parts by weight) | | | | | | | | | | |
| NIPOL 9528R | 137.5 | 137.5 | 137.5 | 137.5 | 137.5 | 137.5 | 137.5 | 137.5 | 137.5 | 137.5 |
| Nipsil AQ | 40 | — | — | — | — | — | — | — | — | 20 |
| Si-69 | 3.2 | — | — | — | — | — | — | — | — | 1.6 |
| Diablack N234 | 40 | 80 | — | — | — | — | — | — | — | — |
| #44 | — | — | 80 | — | — | — | — | — | — | — |
| #33 | — | — | — | 80 | — | — | — | — | — | — |
| Printex 300 | — | — | — | — | 80 | — | — | — | — | 60 |
| #7400SB | — | — | — | — | — | 80 | — | — | — | — |

TABLE II-continued

|  | Comp. Ex. 1 | Comp. Ex. 2 | Comp. Ex. 3 | Comp. Ex. 4 | Ex. 5 | Comp. Ex. 5 | Ex. 6 | Ex. 7 | Comp. Ex. 6 | Ex. 8 |
|---|---|---|---|---|---|---|---|---|---|---|
| Ravem 1000 | — | — | — | — | — | — | 80 | — | — | — |
| Reagal 660 | — | — | — | — | — | — | — | 80 | — | — |
| #950 | — | — | — | — | — | — | — | — | 80 | — |
| Santoflex 6PPD | 1 | 1 | 1 | 1 | 1 | 1 | 1 | 1 | 1 | 1 |
| Zinc Oxide No. 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Santocure NS | 1.5 | 1.5 | 1.5 | 1.5 | 1.5 | 1.5 | 1.5 | 1.5 | 1.5 | 1.5 |
| Sulfur | 2.0 | 2.0 | 2.0 | 2.0 | 2.0 | 2.0 | 2.0 | 2.0 | 2.0 | 2.0 |
| pH of carbon | 7 | 7 | 8 | 8 | 9.5 | 7.0 | 10 | 8.5 | 7.0 | 9.5 |
| $N_2SA$ of carbon | 123 | 123 | 125 | 93 | 80 | 85 | 89 | 112 | 250 | 80 |
| DBPA of carbon | 124 | 124 | 76 | 76 | 72 | 73 | 58 | 60 | 80 | 72 |
| Particle size of carbon (nm) | 22 | 22 | 24 | 28 | 27 | 28 | 24 | 24 | 16 | 27 |
| Evaluation |  |  |  |  |  |  |  |  |  |  |
| tan δ/E' (0° C.) | 100 | 93 | 97 | 98 | 113 | 96 | 107 | 103 | 74 | 119 |
| T95 (min) | 20.6 | 7.1 | 6.4 | 6.7 | 6.7 | 7.1 | 6.6 | 7.3 | 7.3 | 9.3 |

Footnotes of Table II

Nipol 9528R: Styrene-butadiene copolymer rubber made by Zeon Corporation (37.5 phr oil extended, Tg=−35° C.).
Nipsil AQ: Wet silica made by Japan Silica.
Si-69: Silane coupling agent made by Degussa.
Diablack N234: Carbon black made by Mitsubishi Chemical.
44: Carbon black made by Mitsubishi Chemical.
33: Carbon black made by Mitsubishi Chemical.
Printex 300: Carbon black made by Degussa.
7400SB: Carbon black made by Tokai Carbon.
Ravem 1000: Carbon black made by Columbian Carbon.
Reagal 660: Carbon black made by Cabot.
950: Carbon black made by Mitsubishi Chemical.
Santoflex 6PPD: Antioxidant made by Flexsys.
Zinc Oxide No. 3: made by Seido Chemical.
Stearic acid: made by Nippon Oil and Fat Co.
Aromatic oil: made by Fuji Kosan.
Santocure NS: Vulcanization accelerator made by Flexsys.
Sulfur: made by Tsurumi Chemical.

INDUSTRIAL APPLICABILITY

The carbon black used in the present invention has a pH of 1 to 5 or 8.5 to 13 or different in the surface activity from the ordinal furnace black used for rubber (pH: about 6 to 8), and does not form a tight bound rubber and has few strongly constrained rubber molecules, and therefore, the modulus in the low strain region is decreased as in the case of blending with silica. The carbon black used in the present invention is not preferable due to the deterioration of the dispersion to the rubber if the particle size is less than 15 nm and is insufficient in reinforcing ability if the particle size is more than 40 nm. Further, when the structure of the carbon black is small, the filler will have difficulty in forming a network in the rubber and the modulus of elasticity in the low strain region will fall.

As a result, the rubber composition for a tire according to the present invention, as described in N. Amino, Y. Uchiyama: *Tire Science and Technol.*, vol. 28, p. 178 (2000), is improved in tan δ/E' highly correlated with the wet frictional force, and exhibits a wet frictional force equal to or better than silica. According to the present invention, there is no problem of deterioration of the conductivity, unlike in the case of silica and the vulcanization speed is fast, and therefore, there is the advantage that the productivity is greatly improved. Thus, the present composition is useful for a tread part of a pneumatic tire.

What is claimed is:

1. A pneumatic tire having a tire tread potion comprising a rubber composition comprising (i) 100 parts by weight of a diene-based rubber and (ii) 5 to 120 parts by weight of carbon black having a particle size of 15 to 40 nm, a nitrogen absorption specific surface area $N_2SA$ of 60 to 200 m$^2$/g, and a pH of 1 to 5 and a dibutyl phthalate absorption DBPA of 30 to 80 ml/100 g.

2. A pneumatic tire as claimed in claim 1, wherein said diene-based rubber is at least one member selected from the group consisting of natural rubbers, polyisoprene rubbers, polybutadiene rubbers, styrene-butadiene copolymer rubbers and ethylene-propylene-diene terpolymer rubbers.

3. A pneumatic tire as claimed in claim 1, wherein said carbon black is carbon black having a particle size of 18 to 35 nm, a nitrogen absorption specific surface area $N_2SA$ or 70 to 180 m$^2$/g, a dibutyl phthalate absorption DBPA of 35 to 75 ml/100 g and a pH of 2 to 4.5.

4. A pneumatic tire as claimed in claim 2, wherein said carbon black is carbon black having a particle size of 18 to 35 nm, a nitrogen absorption specific surface area $N_2SA$ or 70 to 180 m$^2$/g, a dibutyl phthalate absorption DBPA of 35 to 75 ml/100 g and a pH of 2 to 4.5.

* * * * *